March 28, 1944.  E. B. MORGAN ET AL  2,345,280
HYDRAULIC BRAKE CONTROL SYSTEM
Filed Sept. 16, 1940
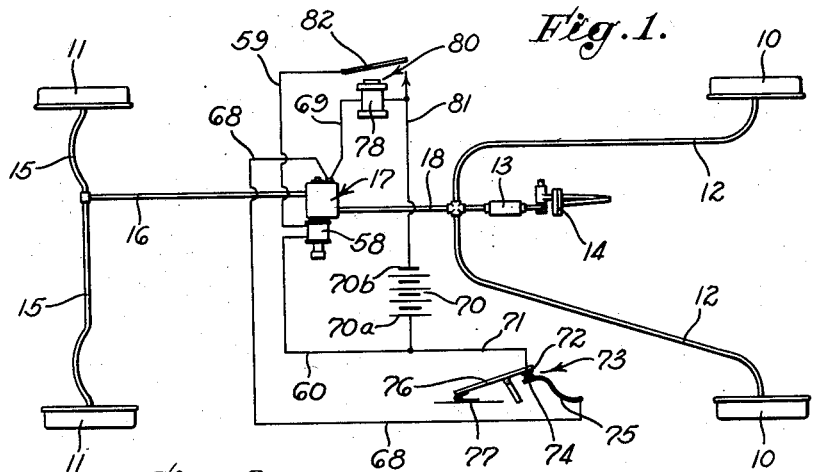
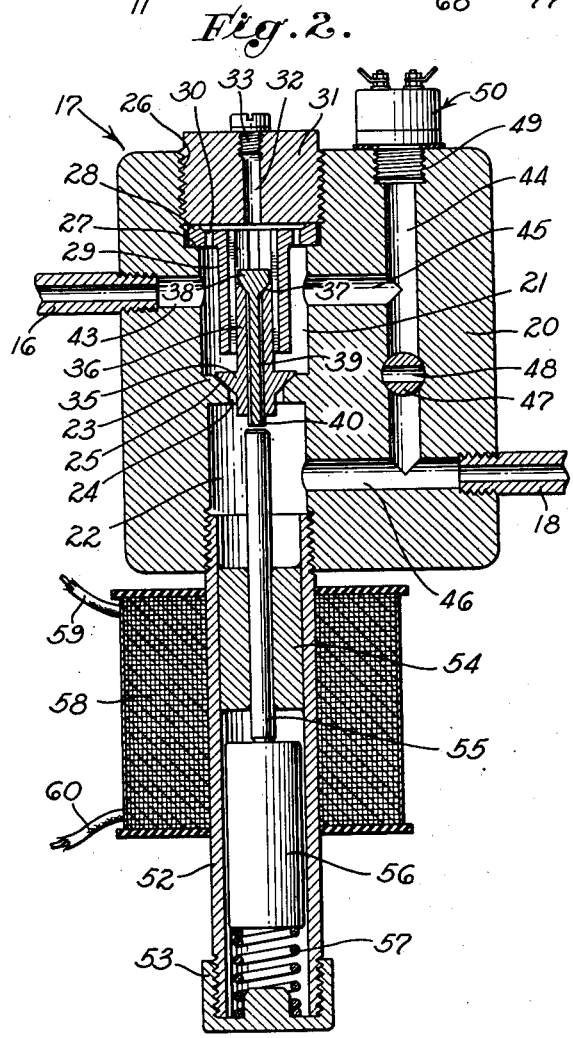
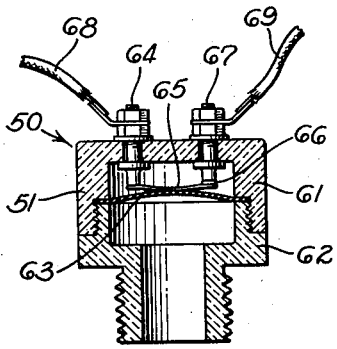
INVENTORS
EARL B. MORGAN
JOE F. WOODS
HARRIS, KIECH, FOSTER & HARRIS
ATTORNEYS.

Patented Mar. 28, 1944

2,345,280

UNITED STATES PATENT OFFICE 2,345,280

HYDRAULIC BRAKE CONTROL SYSTEM

Earl B. Morgan and Joe F. Woods, Los Angeles, Calif.; said Woods assignor to said Morgan Application September 16, 1940, Serial No. 356,944

10 Claims. (Cl. 192—3)

Our invention relates to the hydraulic brake art, and more particularly to a brake system utilizing hydraulic brakes. The invention is of particular utility in connection with a hydraulic brake system for automotive vehicles and, consequently, will be described in connection with such use, although it is to be understood that the invention is susceptible of other uses, and we do not intend to be limited to the embodiment described hereinafter.

It is a primary object of our invention to provide a hydraulic brake system in which when a brake pedal is depressed to actuate the system by the application of hydraulic pressure, such pressure is maintained on the system, or a part thereof, by suitable valve means until released by actuation of suitable valve release means. It is a further object of our invention to provide such a system for a prime mover in which the valve means is only actuated to release the pressure on the system in response to actuation of the accelerator or other energy control for the prime mover.

It is a further object of our invention to provide a hydraulic brake system including check valve means adapted to retain fluid pressure in the system after release of the pressure supplying element or brake pedal, in which the check valve means is opened to release such pressure from the system in response to the operation of a check valve operating control. We prefer to accomplish this by providing electrical means including an electrical circuit connecting the check valve means and the operating control. A further object of our invention is to provide such a construction in which means are provided connecting the hydraulic system and the electrical circuit whereby the electrical circuit can only be energized when a predetermined relatively high fluid pressure exists in the hydraulic system.

Still another object of our invention is to provide a novel type of check valve means adapted to be used in a system as described hereinabove.

Other objects and advantages will be evident from the following specification and the drawing, which is for the purpose of illustration only, and in which:

Fig. 1 is a diagrammatic view of a hydraulic brake system with our invention and the preferred electrical circuit therefor.

Fig. 2 is a vertical view of the check valve means of our invention, partially in section.

Fig. 3 is a vertical sectional view of a pressure operating electric switch which we prefer to use with our invention.

Referring to the drawing, Fig. 1 shows a conventional hydraulic braking system as applied to an automotive vehicle, including front brakes 10 and rear brakes 11, each of the front brakes being connected by piping 12 through a master cylinder 13 of conventional design with a brake pedal mechanism 14, as is well known in the art. The rear brakes 11 are connected through branch piping 15 with a main supply pipe 16 which in turn is connected to the valve means 17 of our invention. Supply piping 18 is connected between the valve means 17 and the piping 12 so as to be supplied with fluid from the master cylinder 13, as is well known in the art.

The valve means 17 includes a housing 20 having an upper bore 21 forming an upper chamber and a lower bore 22 forming a lower chamber, the bores preferably being axially aligned, and the bores being separated by a wall 23 having a cylindrical aperture 24 therethrough, the upper edge of which is outwardly beveled to provide an annular valve seat 25. The upper end of the upper bore 21 is counterbored and threaded as at 26 and provides a shoulder 27 on which seats a ring 28 having a depending tubular portion 29 and having apertures 30 therein spaced as desired around the periphery of the ring. Threaded into the threaded portion 26 of the counterbore in the upper end of the upper bore 21 is a plug member 31 which holds the ring 28 rigidly in position and closes the upper end of the upper bore 21. The plug member 31 is provided with a passage 32 therethrough, in the outer end of which is threaded a bleeder screw 33. Adapted to seat on the annular seat 25 is a main valve member 35 having a tubular valve sleeve 36 preferably formed integrally therewith and extending upwardly therefrom, the upper end of the valve sleeve being inwardly beveled so as to provide a secondary valve seat 37. Adapted to seat on the secondary valve seat 37 is a secondary valve element 38 having a stem 39 extending downwardly through the valve sleeve 36 and the main valve member 35 and being of such length that when the secondary valve member is seated as shown in Fig. 2, the lower end 40 of the stem will project downwardly into the lower bore 22 below the lower face of the main valve element 35.

Provided in the housing 20 is a discharge port 43, the outer end of which is suitably threaded to receive the end of the main supply pipe 16. Also provided in the housing 20 is an auxiliary passage 44 which communicates through an upper port 45 with the interior of the upper bore 21 and which communicates at its lower end through a supply passage 46 with the interior of the lower bore 22 and with supply piping 18 which is suitably threaded into the outer end of the supply passage. Provided in the auxiliary passage 44 between the upper port 45 and the supply passage 46 is a rotatable flow bean 47, which may be of any standard construction as is well known in the art, and which is provided with a transverse passage 48 so that when the flow bean is in the position shown in Fig. 2, fluid communication is cut off between the upper and lower ends of the auxiliary passage 44, and it will be understood that by rotating the flow bean, as is well known in the art, the upper and lower ends of the auxiliary passage may be connected through the transverse passage 48 of the flow bean. The upper end of the auxiliary passage 44 is counterbored and threaded as at 49 to threadedly receive a pressure switch device 50, to be described hereinafter.

The lower end of the lower bore 22 is threaded to receive a tubular sleeve 52, the lower end of which is closed by a threaded cap 53. Rigidly secured in the tubular sleeve 52 is a bushing 54, preferably formed of soft iron or other magnetic material, in which is journalled a plunger element 55 which extends both above and below the bushing, the lower end of the plunger element engaging a cylindrical core member 56 formed of magnetic material which is supported on a compression spring 57, which is in turn held by the threaded cap 53, the compression spring merely acting as a cushion on which the core seats. Surrounding the tubular sleeve 52 and suitably secured relative thereto is a coil 58, the ends of which terminate in conductors 59 and 60. As will be evident to those skilled in the art, the coil 58 and the core member 56 constitute a solenoid means of our invention, and the coil 58 when suitably energized will cause the core member 56 to rise in the tubular sleeve 52, as is well known in the art.

The pressure switch device 50 may be of any suitable type well known in the art, but we prefer to use a construction as shown in which a shell 51 of insulating material is provided having an upper half 61 suitably threaded to a lower half 62, the lower end of the lower half being of reduced diameter and threaded so as to be received in the threaded counterbore 49, there being a diaphragm member 63 formed of resilient material, such as rubber, clamped between the upper and lower halves of the shell. Secured in the upper half 61 of the shell 51 is a binding post 64 to the lower end of which is connected a contact arm 65 formed of resilient electrical conducting material such as spring bronze, the free end of which is provided with an electrical contact 66 disposed beneath the lower end of a binding post 67 also secured in the upper half 61. As will be apparent, the binding posts 64 and 67, the contact arm 65, and the electrical contact 66 are all formed of electrical conducting material so as to establish an electrical circuit therethrough when the contact 66 engages the lower end of the binding post 67 in the position shown in Fig. 3. As will also be apparent, the contact arm 65 engages the diaphragm member 63 but is formed of resilient material so that when less than a predetermined fluid pressure exists in the lower half 62 of the shell below the diaphragm member 63, the contact arm will move downwardly so as to break the electrical contact between the contact 66 and the lower end of the binding post 67. Connected to the binding post 64 is a conductor 68, and connected to the binding post 67 is a conductor 69.

Referring to the electrical circuit shown in Fig. 1, the conductor 68 leads from one end of the coil 58 to one terminal 70a of a battery 70, to which is also connected a conductor 71 leading to an electrical contact 72 of an accelerator switch 73 which includes a second contact 74 resiliently supported on a spring member 75. The second contact 74 is electrically connected through the spring member 75 to the conductor 68. The contact 72 is preferably carried directly on an accelerator pedal 76 which is operated in a well known manner to supply fuel to the engine of the vehicle (not shown). A suitable spring 77 is provided normally to hold the accelerator pedal 76 in an upper position in which the accelerator switch 73 is open when no pressure is exerted by an operator on the accelerator pedal. It will be understood that upon the application of pressure by an operator to the accelerator pedal 76, the contact 72 will engage the contact 74 so as to close the switch 73 and establish an electrical circuit therethrough.

The conductor 69 leads from the binding post 67 to one terminal of a coil 78 of a relay 80, the other end of the coil being connected through a conductor 81 to the other terminal 70b of the battery 70. The relay 80 is provided with a normally open relay-operated switch 82, one contact of which is connected to the conductor 59, and the other contact of which is connected to the conductor 81.

In the operation of our brake system, when the brake pedal 14 is depressed by an operator, operating fluid under relatively high pressure is supplied from the master cylinder 13 through the piping 12 to actuate the front brakes 10, and is supplied through the supply piping 18, the valve means 17, the supply pipe 16, and the branches 15 to actuate the rear brake piping 11. As will be apparent, operating fluid flows from the supply piping 18 through the supply passage 46 of the housing 20 into the lower bore 22 and there exerts a lifting pressure on the lower face of the main valve member 35 to lift the same from its annular valve seat 25 to permit the operating fluid to pass through the vertical aperture 24 into the upper bore 21 and therefrom through the discharge port 43 into the supply pipe 16. The operating fluid also flows from the upper bore 21 through the upper port 45 into the auxiliary passage 44 and thence into the lower half 62 of the pressure switch device 50, upwardly expanding the diaphragm member 63 so as to force the contact arm 65 into a position such that the electrical contact 66 engages the lower end of the binding post 67, in the position shown in Fig. 3. During normal operation of the device, the flow bean 47 will be turned so that the transverse passage 48 therein will be out of registry with the upper and lower ends of the auxiliary passage 44 so as to close off the lower end thereof, in the position shown in Fig. 2.

As soon as the brake pedal mechanism 14 is released by the operator, fluid pressure on the front brakes 10 is relieved, as is well known in the art. With the release of fluid pressure in the supply piping 18, however, the main valve member 35 seats on the annular valve seat 25 so as to prevent the release of fluid pressure from the rear brakes 11, thus continuing to actuate the rear brakes until such time as fluid pressure in the main supply pipe 16 is released. It will be understood, of course, that when the main valve 35 seats, it will carry with it the secondary valve member 38 which has previously seated therein. This pressure is not released until the accelerator pedal 76 is depressed so as to close the accelerator switch 73, thus establishing an electrical circuit from the battery 70 through the conductor 71, the accelerator switch 73, the conductor 68, the pressure switch device 50, the conductor 69, the relay 80, and the conductor 81. Completion of this circuit energizes the relay 80 so as to close the relay-operated switch 82, which in turn sets up a circuit from the battery 70 through the conductor 60, the coil 58, the conductor 59, the relay switch 82, and the conductor 81, and energization of the coil 58 causes the core member 56 to rise in the tubular sleeve 52, carrying with it the plunger element 55, the upper end of which engages the lower end 40 of the stem 39 to move the same upwardly. As will be noted, the secondary valve element 38 is of reduced area, thus permitting a relatively low pressure on the lower end thereof to move the valve element off its seat against the relatively high fluid pressure thereabove. As soon as the secondary valve element 38 moves off its seat 37, fluid can exhaust from the main supply pipe 16 through the upper bore 21, the apertures 30, and the interior of the valve sleeve 36, so as to reduce the fluid pressure on the rear brakes 11 and on the upper face of the main valve member 35 so that continued upward movement of the stem 55 will unseat the main valve member to permit the exhaust flow to flow directly through the aperture 24. It will be appreciated that when the fluid pressure in the auxiliary passage 44 below the diaphragm member 63 is reduced below a predetermined minimum, the diaphragm will contract to permit the contact arm 65 to spring away by its own resiliency from the binding post 67 to open electrical connection therebetween. This is an important feature of the invention, as it provides a means whereby the electrical circuit previously described cannot be energized until such time as the pressure switch device 50 is closed by the application of fluid braking pressure through the brake pedal 14. This insures that no current from the battery 70 will be used by depression of the accelerator pedal 76 during normal driving of the car until such time as pressure is built up in the fluid system by an application of the brake pedal mechanism 14, thus insuring a substantial saving in current. As soon as the electrical circuit containing the relay coil 78 is closed by the pressure switch device 50, the operating circuit containing the solenoid coil 58 may be energized by closing the accelerator switch 73 so as to release the pressure from the rear brakes by raising the secondary valve element 38 from its seat.

If for any reason the electrical circuits hereinbefore described fail to operate by reason of a short-circuit therein, or otherwise, fluid pressure from the rear brakes 11 may be released by rotating the flow bean 47 so as to align the transverse passage 48 with the auxiliary passage 44, thus permitting fluid to exhaust from the supply pipe 16 to the upper bore 21, the upper port 45, and the auxiliary passage 44 into the supply passage 46 and the supply piping 18, thus shunting the flow of operating fluid from the main supply pipe 16 around the valve means into the piping 18. The flow bean 47 may be turned manually by any convenient means, or otherwise, as may be desired, and operates merely as a safety feature of our device, it being evident that when the transverse passage 48 is aligned with the auxiliary passage 44, the main valve member 35 will be shunted out of the fluid circuit so as to permit the fluid system connected to the rear brakes 11 to operate in the conventional manner.

As will be apparent to those skilled in the art, by providing the fixed bushing 54, formed of magnetic material, so as to extend into the coil 58, as shown in Fig. 2, the path of the magnetic flux created by energization of the coil 58 is through the bushing, across the air gap between the lower end of the bushing and the movable core 56, through the movable core 56, and across the air gap between the movable core and the lower end of the coil 58. Since the bushing 54 is formed of magnetic material, the reluctance of the magnetic flux therethrough is reduced, and, consequently, the density of the magnetic flux in the air gap between the lower end of the bushing and the movable core 56 is increased, to increase materially the pull exerted by the magnetic flux on the movable core over the pull which would be created if the bushing 54 were omitted. Consequently, we have found that by utilizing the bushing 54 we can secure an increased pull on the movable core 56 with a current amperage lower than would otherwise be necessary, thus reducing current consumption, and this is an additional important feature of our invention.

It will be apparent to those skilled in the art that certain parts and elements of our device may be replaced by other parts and elements which are the full equivalent thereof in function and method of operation without departing from the spirit of our invention, and consequently we do not intend to be limited to the preferred embodiment described, but desire to be afforded the full protection of the following claims.

We claim as our invention:

1. In a hydraulic brake system for an automotive vehicle, the vehicle having a motor and accelerator means for controlling the speed of the motor, the combination of: fluid operated brake means; a source of fluid under pressure; piping connecting said source of fluid and said brake means; check valve means in the line of said piping adapted to retain in said brake means fluid conveyed thereto from said source of supply; means for opening said check valve means in response to actuation of the accelerator means of the vehicle, so as to release the fluid pressure from said brake means; and means whereby the flow of fluid through said piping can be shunted around said check valve means.

2. In a hydraulic brake system for an automotive vehicle, the vehicle having a motor and accelerator means for controlling the speed of the motor, the combination of: fluid operated brake means; a source of fluid under pressure; piping connecting said source of fluid and said brake means; check valve means in the line of said piping adapted to retain in said brake means fluid conveyed thereto from said source of supply; electrically operated means for opening said check valve means when electrically energized so as to release the fluid pressure from said brake means; and switch means connected to the accelerator of the vehicle and operable in response to actuation thereof to permit energization of said electrically operated means.

3. In a hydraulic brake system for an automotive vehicle, the vehicle having a motor and accelerator means for controlling the speed of the motor, the combination of: fluid operated brake means; a source of fluid under pressure; piping connecting said source of fluid and said brake means; check valve means in the line of said piping adapted to retain in said brake means fluid conveyed thereto from said source of supply; electrically operated means for opening said check valve means when electrically energized so as to release the fluid pressure from said brake means; switch means connected to the accelerator of the vehicle and operable in response to actuation thereof to permit energization of said electrically operated means; and means for preventing energization of said electrically operated means when the fluid pressure on said brake means is below a predetermined minimum.

4. In a hydraulic brake system for an automotive vehicle, the vehicle having a motor and accelerator means for controlling the speed of the motor, the combination of: fluid operated brake means; a source of fluid under pressure; piping connecting said source of fluid and said brake means; check valve means in the line of said piping adapted to retain in said brake means fluid conveyed thereto from said source of supply; electrically operated means for opening said check valve means when electrically energized so as to release the fluid pressure from said brake means; switch means connected to the accelerator of the vehicle and operable in response to actuation thereof to permit energization of said electrically operated means; and means operable in response to a predetermined rise in fluid pressure on said brake means to permit electrical energization of said electrically operated means.

5. In a hydraulic brake system for an automotive vehicle having front wheel means and rear wheel means, a motor, and an accelerator means for controlling the speed of the motor, the combination of: front brake means associated with the front wheel means of the vehicle; rear brake means associated with the rear wheel means of the vehicle; a source of supply of operating fluid under pressure; first supply piping connecting said source of supply and said front brake means; second supply piping connecting said source of supply and said rear brake means; check valve means in the line of said second supply piping adapted to retain in said rear brake means operating fluid conveyed thereto from said source of supply; and means for opening said check valve means in response to actuation of the accelerator means of the vehicle, so as to release the fluid pressure from said rear brake means.

6. In a hydraulic brake system for an automotive vehicle having front wheel means and rear wheel means, a motor, and an accelerator means for controlling the speed of the motor, the combination of: front brake means associated with the front wheel means of the vehicle; rear brake means associated with the rear wheel means of the vehicle; a source of supply of operating fluid under pressure; first supply piping connecting said source of supply and said front brake means; second supply piping connecting said source of supply and said rear brake means; check valve means in the line of said second supply piping adapted to retain in said rear brake means operating fluid conveyed thereto from said source of supply; electrically operated means for opening said check valve means when electrically energized so as to release the fluid pressure from said brake means; and switch means connected to the accelerator of the vehicle and operable in response to actuation thereof to permit energization of said electrically operated means.

7. In a brake system for a device having a motor and control mechanism for controlling the speed of the motor, the combination of: brake means; means for operating said brake means so as to apply pressure thereto; holding means for retaining said pressure on said brake means; release means operable in response to the operation of said control mechanism to release said holding means to release said pressure from said brake means; and means for preventing actuation of said release means when said pressure is below a predetermined minimum.

8. In a hydraulic brake system for an automotive vehicle having a motor and accelerator means for controlling the speed of the motor, the combination of: fluid operated brake means; a source of fluid under pressure; piping connecting said source of fluid under pressure and said brake means; check valve means in the line of said piping adapted to retain in said brake means fluid conveyed thereto from said source of supply, said check valve means including a main valve seat having a main valve member adapted to seat thereon, a secondary valve seat having a secondary valve member of relatively small area adapted to seat thereon, said main valve member being adapted to be lifted from its seat by a flow of fluid from said source of supply to said brake means and being adapted to close to prevent a reverse flow; solenoid means connected to said secondary valve member and adapted when electrically energized to move said secondary valve member off its seat so as to release the fluid pressure on said brake means; an electric circuit connected to said solenoid means for energizing the same, said circuit normally being open; and switch means operable in response to actuation of the accelerator means of the vehicle to close said circuit.

9. In a hydraulic brake system for an automotive vehicle having a motor and accelerator means for controlling the speed of the motor, the combination of: fluid operated brake means; a source of fluid under pressure; piping connecting said source of fluid under pressure and said brake means; check valve means in the line of said piping adapted to retain in said brake means fluid conveyed thereto from said source of supply, said check valve means including a main valve seat having a main valve member adapted to seat thereon, a secondary valve seat having a secondary valve member of relatively small area adapted to seat thereon, said main valve member being adapted to be lifted from its seat by a flow of fluid from said source of supply to said brake means and being adapted to close to prevent a reverse flow; solenoid means connected to said secondary valve member and adapted when electrically energized to move said secondary valve member off its seat so as to release the fluid pressure on said brake means; an electric circuit connected to said solenoid means for energizing the same, said circuit normally being open; switch means operable in response to actuation of the accelerator means of the vehicle to close said circuit; and means for maintaining said circuit open when the fluid pressure on said brake means is below a predetermined minimum.

10. In a hydraulic brake system for an automotive vehicle, the vehicle having a motor and accelerator means for controlling the speed of the motor, the combination of: fluid operated brake means; a source of fluid under pressure; piping connecting said source of fluid and said brake means; a valve seat in the line of said piping; a check-valve member entirely within the fluid channel provided by said piping, said check-valve member being movable into said valve seat in the direction in which operating pressure in said line is effective whereby said check-valve member tends to move automatically to closed position by fluid action when operating pressure is created in said line and tends to stay closed under such operating pressure; electrically actuated means to mechanically dislodge said check-valve member from said seat in opposition to operating pressure, thereby to release fluid pressure from said brake means; a circuit for energizing said electrically actuated means; a first switch in said circuit responsive to actuation of the accelerator means; and a second switch in said circuit in series with said first switch, said second switch being normally open and being adapted to close in response to operating pressure in said line.

EARL B. MORGAN.
JOE F. WOODS.